United States Patent

[11] 3,583,727

| [72] | Inventor | George L. Wallis<br>Lenelly Works, 74 Lenelly Road, Talworth, Surbiton, Surrey, England |
|---|---|---|
| [21] | Appl. No. | 800,989 |
| [22] | Filed | Feb. 20, 1969 |
| [45] | Patented | June 8, 1971 |
| [32] | Priority | Feb. 23, 1968 |
| [33] | | Great Britain |
| [31] | | 9011/68 |

[54] TRICYCLE VEHICLES
8 Claims, 8 Drawing Figs.

[52] U.S. Cl. .................................................. 280/283, 280/112, 180/27
[51] Int. Cl. ............................................... B60g 11/20, B60k 25/00
[50] Field of Search ............................................. 280/282, 283, 112, 112.1, 124.3, 270; 180/25—27; 267/57

[56] References Cited

UNITED STATES PATENTS

| 530,552 | 12/1894 | Ridge | 280/112(.1)UX |
| 2,105,553 | 1/1938 | Schroter et al. | 280/112X |
| 2,221,196 | 11/1940 | Klavik | 280/112 |
| 2,819,093 | 1/1958 | Geiser | 280/112 |
| 2,878,032 | 3/1959 | Hawke | 280/112X |

FOREIGN PATENTS

| 1,158,922 | 3/1958 | France | 280/112 |

*Primary Examiner*—Kenneth H. Betts
*Attorneys*—Emory L. Groff and Emory L. Groff, Jr.

ABSTRACT: A tricycle vehicle having a single steerable front wheel and a pair of rear wheels on a common transverse axis, with an articulated frame so that the rider can lean to the one side or the other as when riding a bicycle, with both of the rear wheels maintaining ground contact, and tilt resisting means consisting of one or two torsion bars held at the rear end by a rear wheel frame assembly part and at the front end by a tiltable front main frame part.

PATENTED JUN 8 1971 3,583,727

INVENTOR
GEORGE L. WALLIS
By Emery L. Groff
Atty

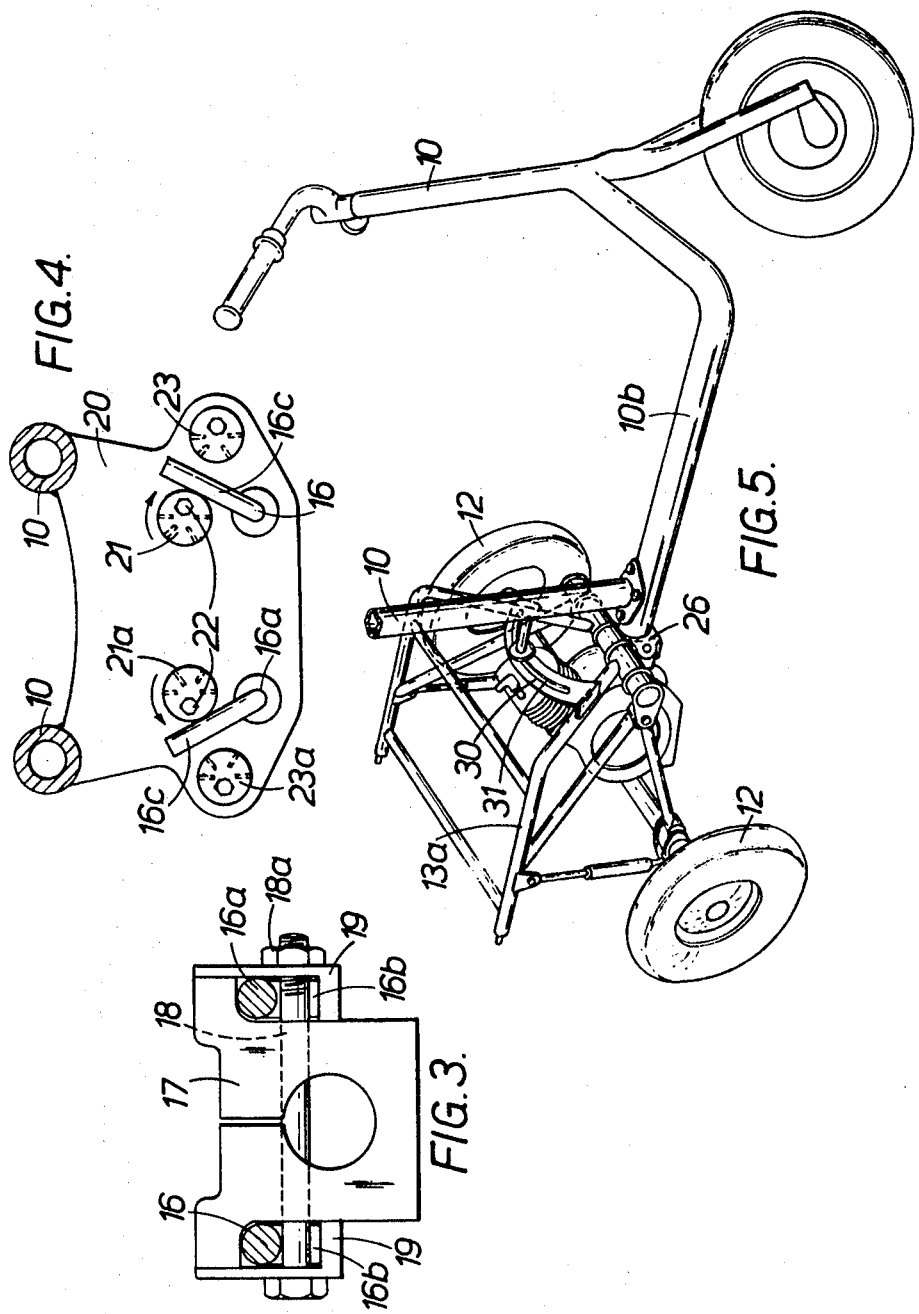

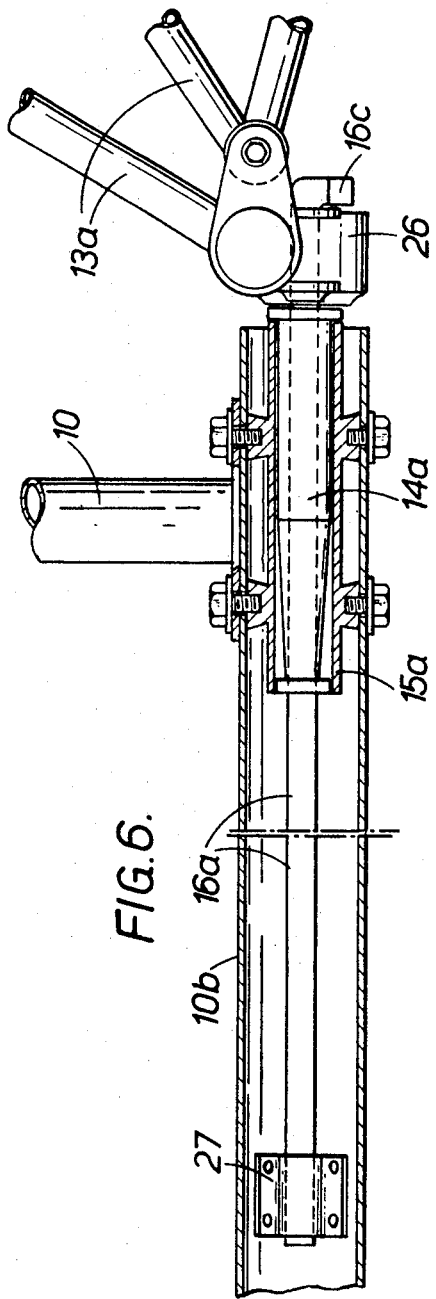
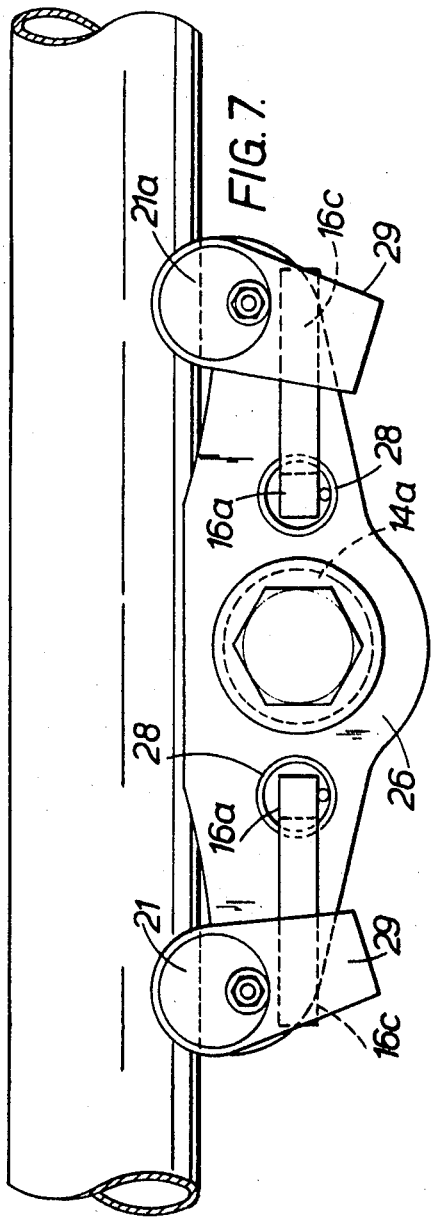
INVENTOR
GEORGE L. WALLIS

TRICYCLE VEHICLES

BACKGROUND OF THE INVENTION

This invention concerns pedal or power driven tricycle vehicles of the type comprising a single front wheel and two rear wheels rotatable about a common axis, and particularly vehicles of this type which include a main frame supporting the front steering wheel and seat for the rider and a rear subframe or assembly supporting a pair of rear wheels on a common transverse axis, the two frames being pivoted together so that a rider can lean over, as when riding a bicycle, when negotiating a bend.

The invention is primarily applicable to such a vehicle as set forth in my prior U.S. Pat. No. 3,504,934 wherein the main frame and subframe assembly are connected by a pivot joint having a turning axis on the centerline of the vehicle, which is arranged so that when the main frame is tilted to the one side or the other, the rear wheel on the side opposite to the direction of tilt moves forwardly with respect to the other rear wheel.

Another object of this invention is to provide a tricycle vehicle as above set forth which is stable and easily controlled when ridden. Another object of the invention is to provide a vehicle having spring means of simple form to produce a force resistive to tilting, enabling a rider to lean naturally when negotiating a bend, which means do not yield too greatly nor provide too strong a force at small angles of tilt, but which provide a sufficiently strong and resilient force to resist tilting at all normal angles.

According to the invention the vehicle comprises a front main frame, a single steerable front wheel mounted thereon, a seat for a rider supported by said main frame, a rear subframe assembly, a pair of rear wheels mounted on said assembly on a common transverse axis, a pivot joint connecting said main frame to the forward portion of said rear subframe assembly at a point intermediate said front wheel and said rear wheels to enable the main frame to tilt to one side or the other when travelling around a bend in accordance with the leaning over of the rider whereby said joint is laterally displaced, with the turning axis of said joint disposed on a longitudinal axis extending forwardly substantially from the vertical centerline of said rear wheel axis through the normal upright steering axis of said front wheel and sloping upwardly from the rear of said vehicle to the front thereof, said tilting of said main frame laterally displacing said pivot in the direction of tilt to cause said rear wheel on the outside of the bend to move forwardly with respect to the inside said rear wheel, and spring means between the subframe assembly and main frame said spring means comprising torsion bar means held at the rear end by the subframe assembly and extending forwardly therefrom and held at the front end by the main frame, said torsion bar means resiliently resisting tilting of the main frame and applying a downward force on said rear wheel which is on the inside of a curve when the vehicle is turning and also providing shock absorbing and spring mounting of the main frame.

The angle of slope should preferably be between 2° and 5° with respect to the horizontal. An angle of 2½°—3° is found to be suitable. With this arrangement, when the tricycle is negotiating a bend, the front wheel understeers slightly, that is it tends naturally to turn slightly out from the direction of turning of the vehicle. This has a marked effect on stability. Any oversteer, i.e. a natural tendency of the front wheel turning into the bend, produces instability.

The torsion bar means can comprise a single bar on the centerline of the machine and which is anchored at its rear end to the subframe assembly and at its front end to the main frame.

Alternatively, the torsion bar means can comprise two bars disposed adjacent to and one on each side of the centerline of the machine, at a height such that the desired tension is obtained on tilting.

The length and cross-sectional area of the bar or bars is such that desired resistance to tilting is obtained. If a single bar is used, this will be longer and of greater cross-sectional area than if two bars are used.

Where two bars are used, means can be provided to impart to them a pretension, this resulting in a torque acting to hold the machine upright. Further, an arrangement can be provided so that for an initial angle of tilt to one side or the other the torque loading on one bar only increases with tilting, and subsequently, on further tilting, a torque loading on the other bar is produced, so that the torque stress of both bars resists tilting.

It will be understood that resistance to tilting always increases with increase to the tilt angle, and there is no possibility of the spring action being lost as there would be, for example, with coiled springs when fully compressed.

The torsion bar means not only provide for resistance to tilt and applying a downward force to the inside rear wheel when rounding a curve, but also provide shock absorbing means and spring mounting for the main frame. The rider's seat can move downwardly against the spring pressure the torsion bar or bars bowing.

BRIEF DESCRIPTION OF THE DRAWINGS

Two forms of springing and vehicles according to the invention are illustrated, by way of example, in the accompanying drawings in which:

FIG. 3 shows the anchoring of the rear ends of spring bars to the subframe assembly, from the front.

FIG. 4 shows the connection of the front ends of the spring bars to the main frame, also from the front.

FIG. 5 is a front perspective view of another form of tricycle with the second form of springing. FIG. 6 is a sectional side view of the bottom tube of the main frame of FIG. 5, showing the pivot joint and anchoring of the front end of one spring, the eccentrics and stops not being shown.

FIG. 7 is a rear view of FIG. 6 showing the eccentrics and stops, and

DESCRIPTION OF PREFERRED EMBODIMENTS

Figure 1:
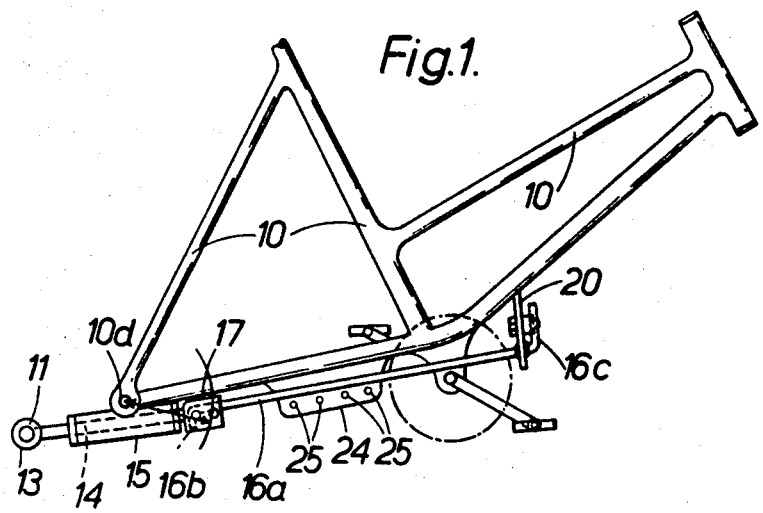
FIG. 1 shows diagrammatically a side view of a main frame of a tricycle with the pivot joint with one form of springing.

The tricycle according to the invention is generally according to my U.S. Pat. No. 3,504,934 and in the construction of FIGS. 1—4, only the essential parts of a main frame 10 are shown. This would have handlebars, saddle and usual components of a tricycle. This construction is primarily for a velocipede, moped or lightweight motorized tricycle. The reference 11 indicates the axle for the pair of rear wheels 12 (FIG. 2) which are appropriately driven in conventional manner according to the form of vehicle. The rear wheel axis is shown supported in a bush 13 which constitutes or forms a part of a subframe assembly, which can, for example, include a banjo or frame support for the axis. The front main frame and rear subframe assembly can be constructed generally as shown in my U.S. Pat. No. 3,504,934 above mentioned.

The main frame and subframe assembly are connected by a joint comprising a spindle 14 secured to the bush 13 and a sleeve 15 to which the rear end of the main frame is connected. This joint may incorporate a resilient bush.

The spindle 14 extends from the front end of the sleeve, and a pair of spring torsion rods 16, 16a are secured to the spindle at their rear ends, so that they are constrained from moving at these ends with the tilting of the main frame 10. As shown (FIG. 3), a clamp block 17 is provided and the end of each spring rod has a lateral extension, for example by bending over as at 16b (see also FIG. 1). The clamp block has a longitudinal bore which at its rear end receives the extending part of the spindle, and a second transverse bore for a bolt 18. The rear ends of the rods 16, 16a are clamped by lugged washers 19, 19, by tightening a nut 18a on the bolt, this action also clamping the block on the spindle end. The spindle and its bore could be splined or of noncircular cross section to ensure a firm grip. Two nut and bolt assemblies could be provided.

The rods extend forwardly from the rear frame assembly below the main frame 10 and one on each side of and close to the centerline of the vehicle.

The main frame 10 has a plate 20 secured thereto forwardly of the bottom bracket and transversely of the frame. This plate supports the front ends of the rods 16, 16a in bushes, which ends also are bent over at 16c forming lateral extensions to lie on the front surface of the plate 20. The ends 16c could be clamped to the plate 20, but preferably they are arranged for pretensioning by means of cams or eccentrics 21, 21a. Each cam or eccentric can be turned by loosening a lock nut 22 so that the angular position of an extension 16c can be varied. By correct pretensioning, the bars 16, 16a can be loaded so as to bias the main frame 10 to a vertical position.

If the main frame is tilted to the left (clockwise FIG. 4), then the rod 16 is twisted by this movement as its end 16c is pressed down by its associated cam 21. The rear ends of both rods maintain position as they are anchored to the subframe assembly 13 and rear wheels. If the rod 16a is pretensioned, then its end 16c will follow its associated cam 21a until relieved of tension. Second cams (23, 23a) are provided, each spaced from the end of one pretensioned rod and forming stops. After the main frame has been tilted through a certain angle, for example to the left, as above mentioned, the end 16c of the rod 16a contacts the associated second cam 23, and continued tilting loads the rod 16a as well as increasing the loading on the rod 16.

The arrangement, therefore, is such that the counterforce set up after a certain angle of tilt of the frame 10 is assisted and increased by the twisting of the rod or bar 16a.

The cams 23, 23a are also adjustable. The same action is, of course, obtained when the main frame is tilted in the opposite direction.

Thus, when the main frame is tilted to one side, a twist is imparted to the rods, so that a torsion loading is obtained, as the spindle cannot turn. This imposes a downward force on the rear wheel on the side to which the frame is tilted. The torque also assists in returning the main frame and maintaining same upright when the machine is not in use, or is being ridden along a straight path.

I will be seen also that when a weight is on the main frame, for example when the vehicle is being used, the torsion bars serve to take the weight and will bow. In this way a shock-absorbing or spring mounting of the frame is obtained.

Figure 2:
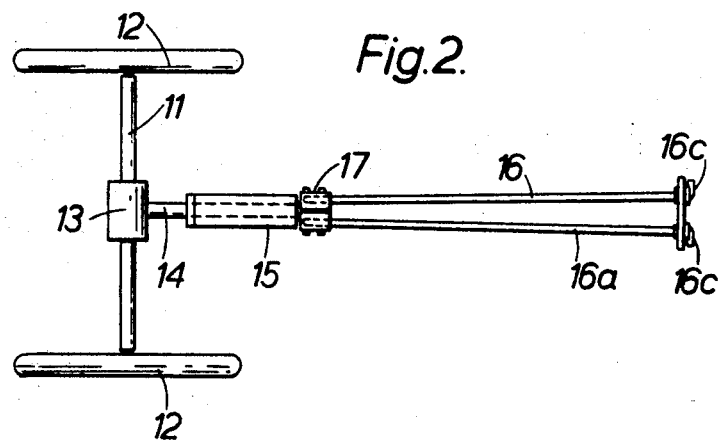
FIG. 2 is a plan view of the rear axle, pivot joint and springing shown in FIG. 1.

FIG. 1 also shows an arrangement whereby the degree of springyness can be adjusted, for example for riders of different weights. The frame 10 is pivoted on a horizontal pivot axis at 10d to the sleeve 15 and a plate 24 (or a pair of parallel plates) depends from the bottom bar or bars of the frame and has a series of holes 25, so that a cross pin can be engaged through a selected hole. In this way the effective length of the springs can be altered without, however, affecting operation as a torque-loading spring structure.

Alternatively, means can be provided for applying an upward bow to the torsion springs, which bow can be varied. Thus, instead of the plate and pin construction, cam means can be provided, these being adjustable and capable of being held in adjusted position. This enables the degree of springyness to be adjusted by a rider quickly to suit different road conditions.

The frame 10 is shown of tubular construction. It could, of course, be made of sheet metal, formed to channel or box section, and the spring rods could be housed therein.

A single torsion bar can be provided, extending from the clamp block 17 to the plate 20, as will be apparent from FIG. 1. The bar will extend along the centerline of the machine, and clamped on the plate 20.

FIGS. 5—7 illustrate a heavier and stronger vehicle, being a motorized vehicle which is capable of carrying loads on the rear subframe assembly. In this arrangement, the main frame 10 has a bottom tube 10b of an internal diameter to accommodate the rods 16, 16a, which are of square cross section. The rods are anchored at their front ends in the tube, and have torque adjusting means at their rear ends.

As shown in FIG. 6, a sleeve 15a is secured in the rear end of the tube 10b and a spindle 14a is received therein, the rear end of this spindle being clamped to a transverse plate 26 of the rear subframe assembly 13a. The front ends of the rods are clamped against the inner surface of the tube 10b by clamp brackets at diametrically opposite locations, one rod 16a and clamp bracket 27 being shown in FIG. 6, the rod end being within a square-section aperture along the bracket. As shown in FIG. 7, the rear end of each rod passes through a bush 28 in a hole through the transverse plate 26. The rod ends are bent over at 16c and eccentrics 21, 21a, as in the first embodiment, are mounted on the plate 26. These also are adjustable to preset the torque of the rods. In this embodiment each eccentric supports a stirrup 29 forming a stop, so that when the main frame is tilted, for example to the left (anticlockwise FIG. 7), a twist is imparted to the rod 16 and the end 16c of the rod 16a initially will rise due to its preloading, until it meets the bottom of its stirrup, when it is twisted to add loading to that of the rod 16. In both constructions manually operable means preferably are provided to enable the main frame to be locked relatively to the subframe assembly, for example when the machine is stationary. Such means generally can be in accordance with those described and illustrated in my U.S. Pat. No. 3,504,934 and include a plate 30 secured to the subframe assembly, said plate having a slot 31 arcuate with respect to the axis of the spindle 14a Suitable locking means (not shown but as described in the said prior application) on the main frame cooperate with this plate and slot.

In the case where a single torsion bar is used, this will simply be anchored at its rear end to the subframe assembly and at its front end to the main frame.

Figure 8:
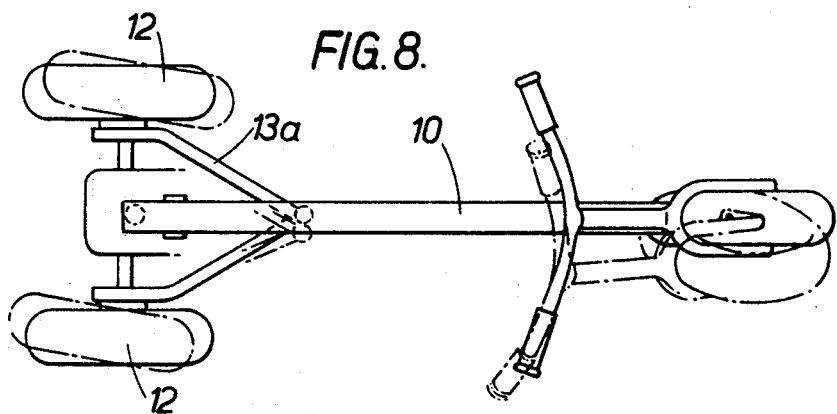
FIG. 8 is a diagrammatic plan view illustrating the tilting action.

Although the embodiments of the tilt-resisting means described and illustrated use spindle and sleeve joints, it will be understood that the invention can be applied to vehicles with ball and socket jointing, as shown diagrammatically in FIG. 8, in which the vehicle is shown in full lines in an upright position and in broken lines when tilted to the right. It will be seen that when tilted, the outside rear wheel moves forwardly with respect to the inside rear wheel, and also that the track of the front wheel virtually moves over towards the track of the outside rear wheel in accordance with the angle of tilting. The axis of the pivot joint between the frames must slope up from rear to front to produce a satisfactory effect.

I claim:

1. A tricycle vehicle comprising a front main frame, a single steerable front wheel mounted thereon, a seat for a rider supported by said main frame, a rear subframe assembly, a pair of rear wheels mounted on said assembly on a common transverse axis, a pivot joint connecting said main frame to the forward portion of said rear subframe assembly at a point intermediate said front wheel and said rear wheels to enable the main frame to tilt to one side or the other when travelling around a bend in accordance with the leaning over of the rider whereby said joint is laterally displaced, with the turning axis of said joint disposed on a longitudinal axis extending forwardly substantially from the vertical center line of said rear wheel axis through the normal upright steering axis of said front wheel and sloping upwardly from the rear of said vehicle to the front thereof, said tilting of said main frame laterally displacing said pivot in the direction of tilt to cause said rear wheel on the outside of the bend to move forwardly with respect to the inside said rear wheel, and spring means between the subframe assembly and main frame said spring means comprising torsion bar means held at the rear end by the subframe assembly and extending forwardly therefrom, and held at the front end by the main frame, said torsion bar means resiliently resisting tilting of the main frame and applying a downward force on said rear wheel which is on the inside of a curve when the vehicle is turning and also providing shock absorbing and spring mounting of the main frame.

2. A tricycle vehicle as claimed in claim 1, wherein the tilt resisting means comprises a single bar on the centerline of the vehicle and which is anchored at its rear end to the subframe assembly and at its front end to the main frame.

3. A tricycle vehicle as claimed in claim 1, wherein the tilt resisting means comprises two bars disposed adjacent to and one on each side of the pivot axis of the vehicle.

4. A tricycle vehicle as claimed in claim 3, having means for pretensioning said bars.

5. A tricycle vehicle as claimed in claim 4, wherein means are provided for adjusting the pretensioning of the bars.

6. A tricycle vehicle as claimed in claim 5, wherein the one end of each bar is anchored to the one frame, and the other end of each bar is mounted on the other frame in a bearing and has a lateral extension one side of which is engaged by a cam or eccentric member, which can be adjusted in relation to said extension.

7. A tricycle vehicle as claimed in claim 6, wherein a stop is provided adjacent to and spaced from the other side of the extension, whereby when the frame is tilted to one side the extension of the bar on the other side disengages its cam or eccentric, and after a predetermined angle of tilt said extension engages the stop.

8. A tricycle vehicle as claimed in claim 7, wherein the spacing of the stop from the extension is adjustable.